(12) United States Patent
Maeda (10) Patent No.: US 11,110,986 B2
(45) Date of Patent: Sep. 7, 2021

(54) MANUFACTURING METHOD OF BODY FRAME

(71) Applicant: YAMAHA HATSUDOKI KABUSHIKI KAISHA, Iwata (JP)

(72) Inventor: Tomohito Maeda, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/067,207

(22) Filed: Oct. 9, 2020

(65) Prior Publication Data

US 2021/0107586 A1 Apr. 15, 2021

(30) Foreign Application Priority Data

Oct. 11, 2019 (JP) .............................. JP2019-187975

(51) Int. Cl.
*B23P 19/04* (2006.01)
*B62K 19/30* (2006.01)

(52) U.S. Cl.
CPC .............. *B62K 19/30* (2013.01); *B23P 19/04* (2013.01)

(58) Field of Classification Search
CPC .................................. B62K 19/30; B23P 19/04
See application file for complete search history.

(56) References Cited

U.S. PATENT DOCUMENTS 6,981,712 B2 1/2006 Takano
7,311,232 B2 * 12/2007 Watanabe .................. B62J 7/08
224/413
9,211,773 B2 * 12/2015 Kitamura .................. B62K 5/05
2002/0020985 A1 * 2/2002 Nakagawa ........... B62K 25/283
280/288
2004/0232183 A1 * 11/2004 Watanabe .................. B62J 9/20
224/413

(Continued)

FOREIGN PATENT DOCUMENTS

JP S61178276 A 8/1986
JP 2570820 Y2 * 5/1998

(Continued)

OTHER PUBLICATIONS

Office Action in the couterpart Indian patent application (202024043516) dated Jun. 22, 2021.

*Primary Examiner* — Bayan Salone
(74) *Attorney, Agent, or Firm* — Rabin & Berdo, P.C.

(57) ABSTRACT

A plurality of main frame members that are commonly usable for a plurality of types of straddled vehicles are fabricated. Left and light pivot shaft supporting portions are provided in each main frame member. The left and right pivot shaft supporting portions include left and right hole formable portions in which left and right pivot holes are formable and which have areas larger than an area of a head portion of a pivot shaft, respectively. One of the pivot shaft supporting portions includes a rotation restricting portion that restricts rotation of the head portion of the pivot shaft inserted into the pivot hole. The pivot holes are respectively formed at predetermined positions at pivot shaft supporting portions of each main frame member, and the predetermined positions are different in accordance with a type of a vehicle for which each main frame member is to be used.

7 Claims, 9 Drawing Sheets

(56) References Cited

U.S. PATENT DOCUMENTS

| | | | | |
|---|---|---|---|---|
| 2008/0073139 A1* | 3/2008 | Conrad | ................ | B62K 25/283 |
| | | | | 180/227 |
| 2014/0361502 A1* | 12/2014 | Kitamura | ................ | B62K 5/05 |
| | | | | 280/5.515 |
| 2016/0288858 A1 | 10/2016 | Tada et al. | | |

FOREIGN PATENT DOCUMENTS

| | | | | | |
|---|---|---|---|---|---|
| JP | 2570820 | Y2 | | 5/1998 | |
| JP | 2001172796 | A | * | 6/2001 | |
| JP | 2001172796 | A | | 6/2001 | |
| JP | 2002337780 | A | | 11/2002 | |
| JP | 3933314 | B2 | * | 6/2007 | ............ B21D 53/86 |
| JP | 3933314 | B2 | | 6/2007 | |
| JP | 4015265 | B2 | * | 11/2007 | |
| JP | 4015265 | B2 | | 11/2007 | |
| JP | 5145586 | B2 | | 2/2013 | |
| JP | 5459554 | B2 | * | 4/2014 | |
| JP | 6459554 | B2 | * | 1/2019 | |
| JP | 6459554 | B2 | | 1/2019 | |
| WO | 2017125803 | A1 | | 7/2017 | |
| WO | 2017158817 | A1 | | 9/2017 | |

* cited by examiner

MANUFACTURING METHOD OF BODY FRAME

CROSS REFERENCE TO RELATED APPLICATIONS

This application is based upon and claims the benefit of priority of the prior Japanese Patent Application No. 2019-187975, filed on Oct. 11, 2019, the entire contents of which are incorporated herein by reference.

BACKGROUND

Technical Field

The present invention relates to a manufacturing method of a body frame used in each of a plurality of types of straddled vehicles.

Description of Related Art

Out of various design items of a motorcycle, a caster angle is mentioned as an element that affects riding comfort. The caster angle is the angle between a vertical line with respect to a road surface and a steering shaft supported at a head pipe. The larger the caster angle is, the higher stability of a vehicle is when the vehicle is traveling in a straight line. Further, the smaller the caster angle is, the higher responsiveness of the vehicle is when the vehicle is turning.

An element that affects riding comfort of the motorcycle is not limited to the above-mentioned caster angle, and a supporting position of a pivot shaft in a body frame is also mentioned as the element. In JP 2570820 Y2, the configuration for changing the supporting position of a pivot shaft in a body frame of a motorcycle in accordance with the course on which the motorcycle travels or the like is described. Specifically, an attachment portion of the pivot shaft is provided at the body frame described in JP 2570820 Y2. A supporting hole that penetrates in a width direction of a vehicle body is formed in the attachment portion of the pivot shaft.

A plurality of types of supporting members that can be fitted into the supporting holes are prepared. These supporting members have through holes into which the pivot shaft is inserted and which support the pivot shaft with the supporting members fitted into the supporting holes.

In the plurality of types of supporting members, the positions at which the through holes are formed are set to be different from one another. With this configuration, any of the plurality of types of supporting members is selectively fitted into the supporting hole of the body frame, whereby the supporting position of the pivot shaft can be adjusted to a desirable position.

SUMMARY

Conventionally, a plurality of types of motorcycles have been manufactured by fabricating body frames in accordance with riding comfort required for motorcycles in regard to each of the types of motorcycles. Contrary to this, if it is possible to fabricate the plurality of types of motorcycles by using a commonly designed body frame, it is considered that a manufacturing cost of the plurality of types of motorcycle can be reduced.

In order to obtain riding comfort corresponding to the type of the motorcycle using the commonly designed body frame, it is necessary to adjust the supporting position of a pivot shaft for each type of a motorcycle, for example. As such, the method of providing the supporting hole described in JP 2570820 Y2 in the commonly designed body frame and attaching a supporting member corresponding to the type of the motorcycle to the supporting hole is considered. However, with the configuration in which the pivot shaft is supported at the body frame via the supporting member, a dimension error of the supporting position of the pivot shaft increases as compared to the configuration in which the pivot shaft is directly supported at the body frame.

Further, it is difficult to actually reduce the manufacturing cost of the plurality of types of motorcycles since a step of fabricating the supporting member and a step of fitting the supporting member into the supporting hole of the body frame are required in addition to the fabrication of the body frame.

An object of the present invention is to provide a manufacturing method of a body frame that enables manufacture of a plurality of types of straddled vehicles having mutually different riding comfort at low cost and with high accuracy.

(1) A manufacturing method of a body frame according to one aspect of the present invention includes fabricating a plurality of main frame members that are commonly usable in a plurality of types of straddled vehicles, and forming a pivot hole to which a pivot shaft is attachable in each main frame member, wherein each main frame member includes a hole formable portion in which the pivot hole is formable and which has an area larger than that of a head portion of the pivot shaft, and a rotation restricting portion that restricts rotation of the head portion of the pivot shaft inserted into the pivot hole, the forming a pivot hole in each main frame member includes forming the pivot hole at a predetermined position in accordance with a type of a straddled vehicle in the hole formable portion of each main frame member, and positions of a plurality of pivot holes that are predetermined in accordance with the types of the straddled vehicles in the plurality of main frame members are different from one another.

In the manufacturing method of the body frame, the plurality of main frame members that are commonly used in the plurality of types of straddled vehicles are fabricated. In each fabricated main frame member, the hole formable portion and the rotation restricting portion are included.

Here, the hole formable portion has an area larger than that of the head portion of the pivot shaft. Therefore, in the hole formable portion, the pivot hole can be formed at the plurality of mutually different positions in accordance with the type of the straddled vehicle. Thus, in regard to each main frame member, the pivot hole is formed at the predetermined position corresponding to the type of the straddled vehicle in the hole formable portion. In this case, because the common main frame member can be used in the plurality of types of straddled vehicles, the cost required for fabrication of the plurality of body frames in regard to the plurality of types of straddled vehicles is reduced.

Further, it is not necessary to prepare another member such as a spacer in order to arrange the pivot shaft at a desirable position in the body frame. Thus, an increase in dimension error of the supporting position of the pivot shaft is reduced.

Further, with the above-mentioned configuration of each main frame member, because the rotation of the head portion of the pivot shaft is restricted by the rotation restricting portion when the pivot shaft is attached to the main frame member, the pivot shaft is easily attached to the pivot hole.

As a result, the plurality of types of straddled vehicles having mutually different riding comfort can be manufactured at low cost and with high accuracy.

(2) Each main frame member may constitute a head pipe and may include a pair of left and right main rails that extends rearwardly and downwardly while spreading leftwardly and rightwardly from the head pipe, the hole formable portion may be formed in each of portions that are opposite to each other of the left and right main rails, and the rotation restricting portion may be formed in the hole formable portion of one of the left and right main rails.

In this case, the hole formable portion is formed in each of the portions of the left and right main rails that are opposite to each other. Therefore, with the rear arm arranged between the portions of the left and right main rails that are opposite to each other, the pivot shaft can be attached to the body frame to pass through the left and right pivot holes and the rear arm. Further, at the time of the attachment, the rotation of the pivot shaft is restricted by the rotation restricting portion formed in the hole formable portion of one of the left and right main rails. Thus, the rear arm can be easily attached to the body frame.

(3) The head portion of the pivot shaft may have an oblong shape, the rotation restricting portion may be formed such that the head portion of the pivot shaft is fittable into the rotation restricting portion, and may be formed to extend in a first direction, a length in the first direction of the rotation restricting portion may be larger than a maximum dimension of the head portion of the pivot shaft, and a length in a second direction that is orthogonal to the first direction of the rotation restricting portion may be smaller than the maximum dimension of the head portion of the pivot shaft.

In this case, a plurality of positions in the rotation restricting portion extending in the first direction can be defined as positions for formation of the pivot hole.

(4) Each main frame member may further include a reinforcing portion that surrounds the hole formable portion and projects sidewardly of the main frame member.

In this case, rigidity of the area around the pivot hole is improved by the reinforcing portion in each main frame member. Therefore, the attaching state of the pivot shaft with respect to the body frame is more stabilized.

(5) The manufacturing method of the body frame may further include attaching a rear frame member to each of the fabricated main frame members, and painting the main frame member and the rear frame member after attaching the rear frame member.

In this case, it is not necessary to paint the main frame member and the rear frame member separately. Therefore, the number of steps of manufacturing the straddled vehicle can be reduced, and the manufacturing cost of the straddled vehicle can be more sufficiently reduced.

Other features, elements, characteristics, and advantages of the present disclosure will become more apparent from the following description of preferred embodiments of the present disclosure with reference to the attached drawings.

DETAILED DESCRIPTION

A manufacturing method of a body frame according to one embodiment of the present invention will be described below with reference to the drawings. The body frame according to the present embodiment is a body frame to be used in each of a plurality of types of straddled vehicles. In the body frame, a pivot hole to which a pivot shaft that supports a rear arm (swing arm) is attachable is formed.

[1] Outline of Manufacturing Method of Body Frame

Figure 1:
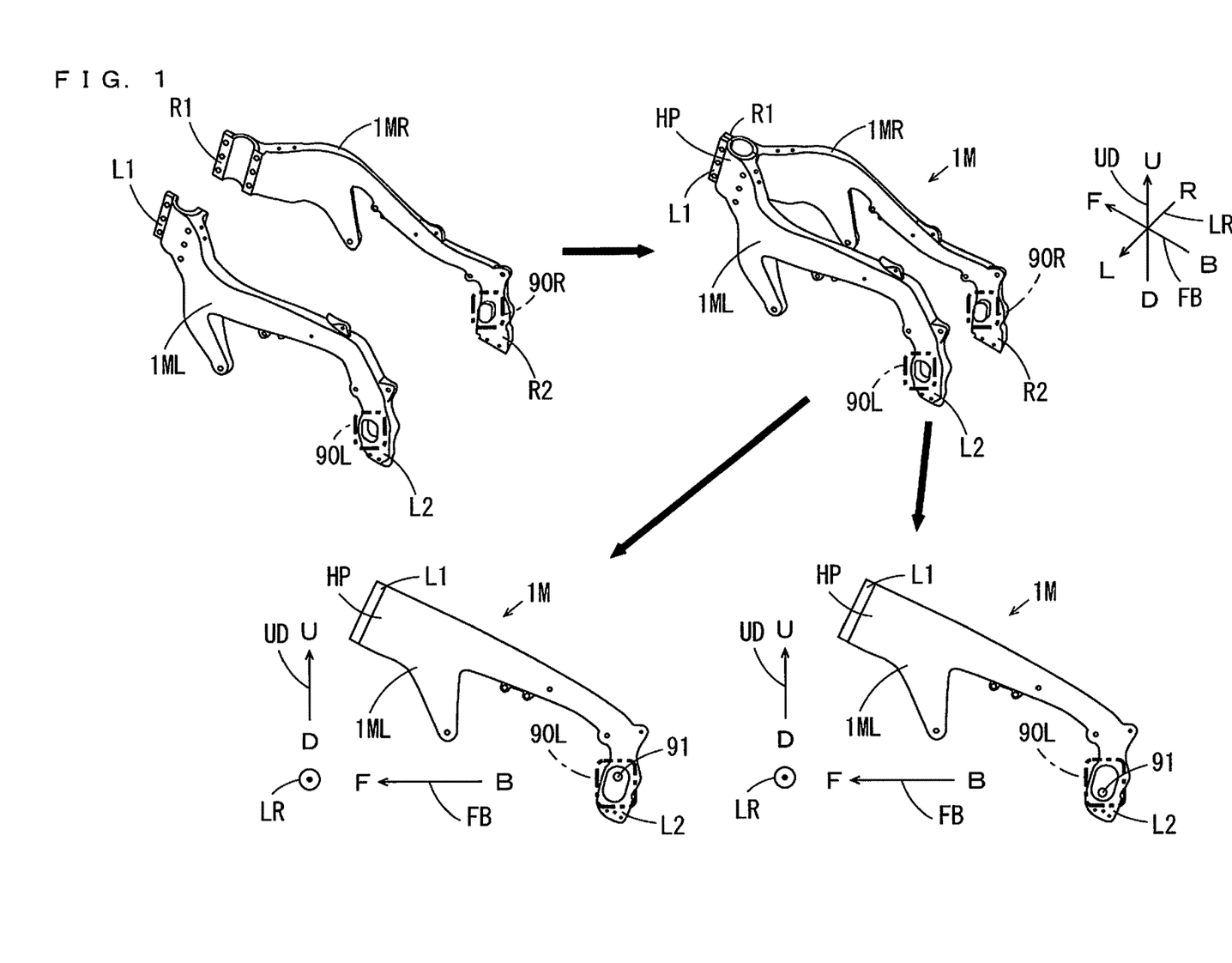
FIG. 1 is a diagram for explaining the outline of a manufacturing method of a body frame according to one embodiment of the present invention.

FIG. 1 is a diagram for explaining the outline of the manufacturing method of the body frame according to the one embodiment of the present invention. The body frame according to the present embodiment is used in a motorcycle which is taken as one example of a straddled vehicle and mainly constituted by a main frame member 1M and a rear frame member 1R (FIG. 8), described below. The main frame member 1M can be used commonly in each of the plurality of types of motorcycles.

First, as shown in an upper left field of FIG. 1, a pair of left and right main rails 1ML, 1MR is fabricated individually and respectively for fabrication of the main frame member 1M. The left main rail 1ML is a metallic single member that extends in one direction while being curved and has first and second end portions L1, L2. The first end portion L1 is formed to constitute a left portion of a head pipe HP, described below, of the body frame. A pivot shaft supporting portion 90L is formed in the vicinity of the second end portion L2 of the main rail 1ML. Details of the pivot shaft supporting portion 90L will be described below.

The right main rail 1MR is a metallic single member that is formed to be basically plane-symmetric with respect to the main rail 1ML. The main rail 1MR has third and fourth end portions R1, R2 respectively corresponding to the first and second end portions L1, L2 of the main rail 1ML. The third end portion R1 is formed to constitute a right portion of the head pipe HP, described below, of the body frame. A pivot shaft supporting portion 90R is formed in the vicinity of the fourth end portion R2 of the main rail 1MR. Details of the pivot shaft supporting portion 90R will be described below.

Next, as shown in an upper right field of FIG. 1, the first end portion L1 of the left main rail 1ML and the third end portion R1 of the right main rail 1MR are connected to each other with a plurality of bolts and a plurality of nuts (not shown). In this case, the head pipe HP is formed by the first end portion L1 of the left main rail 1ML and the third end portion R1 of the right main rail 1MR, so that the main frame member 1M is fabricated. A plurality of main rails 1MLs are connected to a plurality of main rails 1MR, respectively, so that a plurality of main frame members 1M are sequentially fabricated.

In each of FIG. 1 and subsequent given diagrams, a front-and-rear direction FB, a left-and-right direction LR and an up-and-down direction UD of the main frame member 1M are suitably indicated by the arrows. The direction in which the arrow is directed in the front-and-rear direction FB is referred to as forward, and its opposite direction is referred to as rearward. Further, the direction in which the arrow is directed in the left-and-right direction LR is referred to as leftward, and its opposite direction is referred to as rightward. Further, the direction in which the arrow is directed in the up-and-down direction UD is referred to as upward, and its opposite direction is referred to as downward. In each of FIG. 1 and subsequent given diagrams, forward, rearward, leftward, rightward, upward and downward are indicated by reference characters F, B, L, R, U and D, respectively. The front-and-rear direction FB, the left-and-right direction LR and the up-and-down direction UD of the main frame member 1M are respectively the same as a front-and-rear direction FB, a left-and-right direction LR and an up-and-down direction UD of the motorcycle in a case where the main frame member 1M is provided in the motorcycle (see FIGS. 6 to 8).

The left and right main rails 1ML, 1MR of each main frame member 1M extend rearwardly and downwardly while spreading in the left-and-right direction LR from the head pipe HP. In the main frame member 1M, the pivot shaft supporting portions 90L, 90R are opposite to each other in the left-and-right direction LR.

After the plurality of main frame members 1M are fabricated, pivot holes 91 are formed in the left and right pivot shaft supporting portions 90L, 90R of each main frame member 1M. In a side view of the main frame member 1M, the positions of the left and right pivot holes 91 formed in each main frame member 1M affect riding comfort of the motorcycle in which the main frame member 1M is to be used. Thus, in the present embodiment, the positions at which the left and right pivot holes 91 are formed in each main frame member 1M are defined in accordance with the type of the motorcycle in which the main frame member 1M is to be used. Therefore, as shown in a lower field of FIG. 1, in a case where the plurality of main frame members 1M are used in the plurality of types of motorcycles, respectively, the positions of the pivot holes 91 in a side view may be different among the plurality (two in the present example) of main frame members 1M.

While the left and right pivot holes 91 of each main frame member 1M are formed after the left and right main rails 1ML, 1MR are connected to each other, that is, after the main frame member 1M is fabricated in the above-mentioned example, the present invention is not limited to this. For example, the left and right pivot holes 91 of each main frame member 1M may be formed before the left and right main rails 1ML, 1MR are connected to each other, that is, may be formed individually and separately in the left and right main rails 1ML, 1MR that have not been connected to each other yet.

[2] Pivot Shaft

Figure 2:
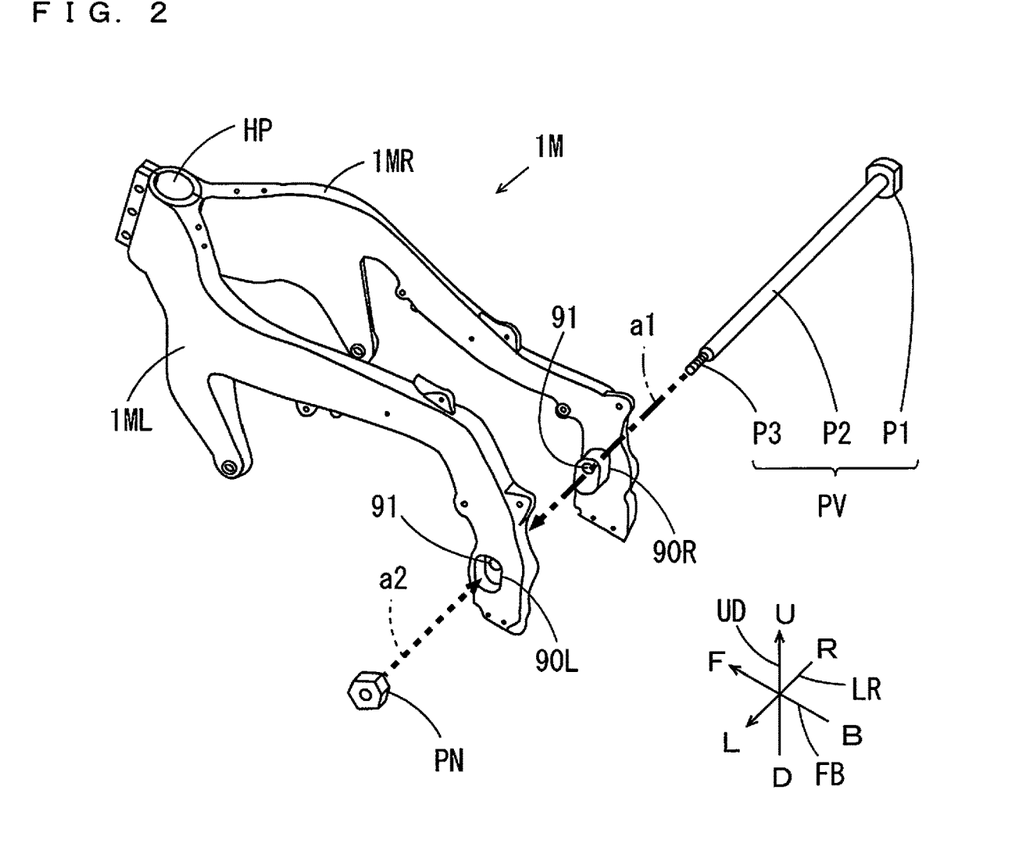
FIG. 2 is an external perspective view for explaining one example of a pivot shaft attached to left and right pivot holes of each main frame member of FIG. 1.
Figure 3:
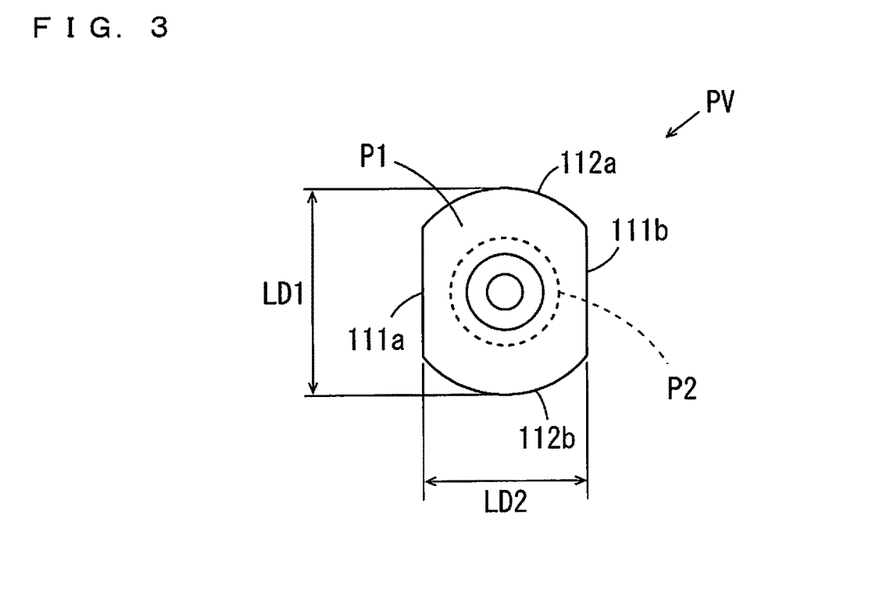
FIG. 3 is a plan view showing the shape of a head portion of the pivot shaft of FIG. 2.

FIG. 2 is an external perspective view for explaining one example of the pivot shaft attached to the left and right pivot holes 91 of each main frame member 1M of FIG. 1, and FIG. 3 is a plan view showing the shape of the head portion P1 of the pivot shaft PV of FIG. 2.

The pivot shaft PV of the present example is a hollow shaft and has the head portion P1, a shaft portion P2 and a screw portion P3 as shown in FIG. 2. The shaft portion P2 has a constant outer diameter corresponding to an inner diameter of the pivot hole 91 to be insertable into the pivot hole 91. Further, the shaft portion P2 has the length corresponding to the distance between the left and right pivot shaft supporting portions 90L, 90R to be able to couple the left and right pivot shaft supporting portions 90L, 90R to each other. The head portion P1 is formed at one end of the shaft portion P2, and the screw portion P3 is formed at the other end of the shaft portion P2. The screw portion P3 constitutes a male screw to which a nut PN, described below, is attachable. The pivot shaft PV may be a solid shaft.

As shown in FIG. 3, the head portion P1 of the pivot shaft PV has an oblong shape in a case where being viewed in an axial direction of the pivot shaft PV. Here, an outer edge of the head portion P1 of FIG. 3 has two portions, which extend linearly and are opposite to each other with an axial center of the pivot shaft PV positioned therebetween. The two portions are referred to as restricted portions 111a, 111b. The outer edge of the head portion P1 of FIG. 3 has two other portions, which extend in an arc shape and are opposite to each other with the axial center of the pivot shaft PV positioned therebetween. The two other portions are referred to as arc portions 112a, 112b.

In this case, a maximum length (maximum dimension of the head portion P1) LD1 of the straight line passing through the arc portions 112a, 112b is larger than a minimum length LD2 of the straight line passing through restricted portions 111a, 111b.

When the pivot shaft PV is attached to the main frame member 1M, the pivot shaft PV is arranged rightwardly of the main frame member 1M such that the screw portion P3 is directed toward the pivot shaft supporting portion 90R. Further, as indicated by the thick one-dot and dash arrow a1 in FIG. 2, the pivot shaft PV is inserted into the right pivot hole 91 and the left pivot hole 91 in this order from a position farther rightward than the main frame member 1M. At this time, the screw portion P3 of the pivot shaft PV projects leftwardly of the left pivot hole 91. As such, as indicated by the thick dotted arrow a2 in FIG. 2, the nut PN is attached to the screw portion P3 of the pivot shaft PV. Thus, the pivot shaft PV is fixed to the main frame member 1M. The nut PN has an outer shape having substantially the same size as that of the head portion P1 of the pivot shaft PV.

The pivot shaft PV may be attached to the main frame member 1M by being inserted into the left pivot hole 91 and the right pivot hole 91 in this order while being inverted in the left-and-right direction LR with respect to the main frame member 1M of FIG. 2. In this case, the head portion P1 of the pivot shaft PV is fixed to the left pivot shaft supporting portion 90L, and the screw portion P3 of the pivot shaft PV is fixed to the right pivot shaft supporting portion 90R by the nut PN. Thus, the structures of hole formable portions 92 (see FIGS. 4 and 5), described below, of the pivot shaft supporting portions 90L, 90R are opposite to each other.

[3] Details of Pivot Shaft Supporting Portions 90L, 90R

Figure 4:
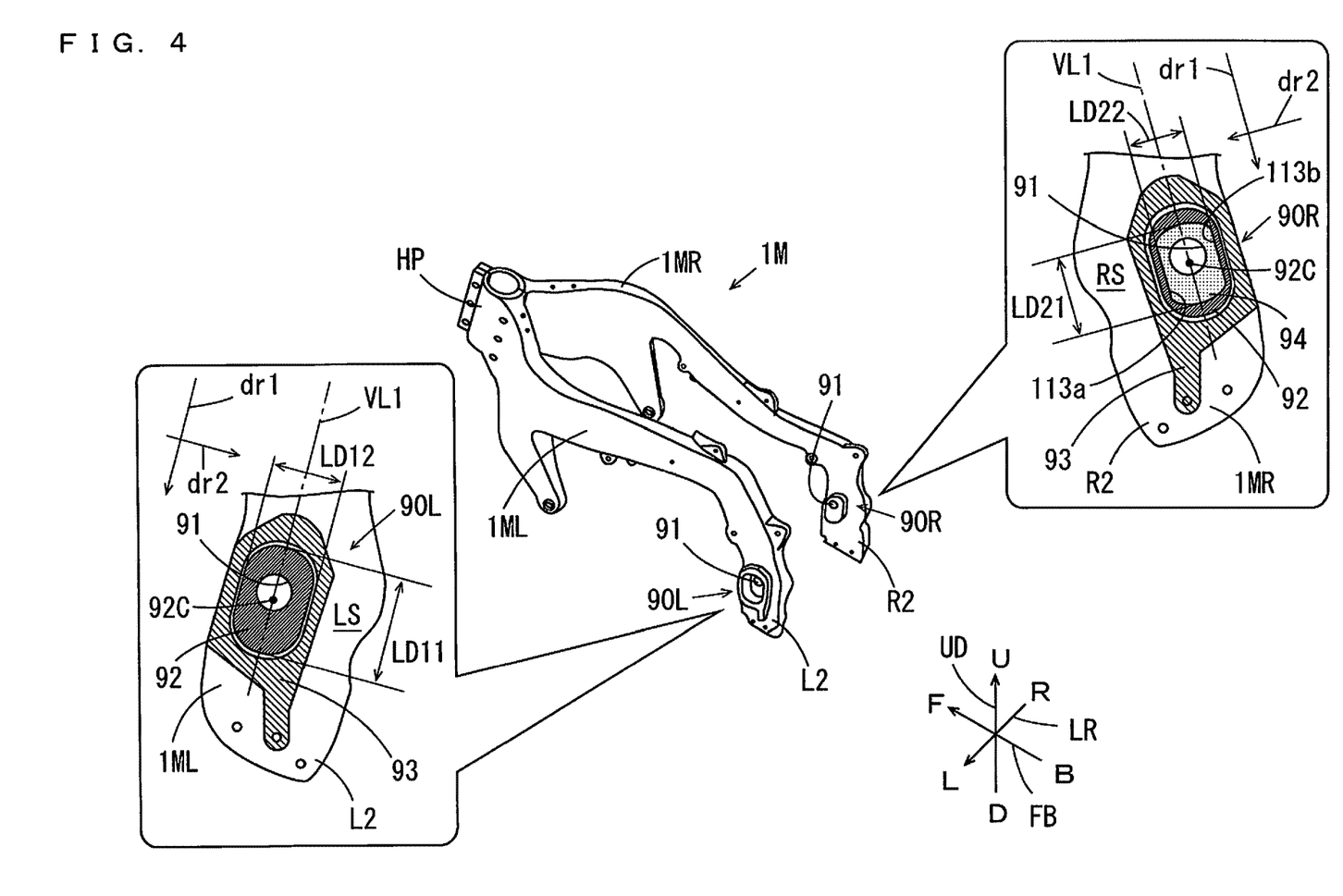
FIG. 4 is a diagram for explaining the details of a pivot shaft supporting portion.
Figure 5:
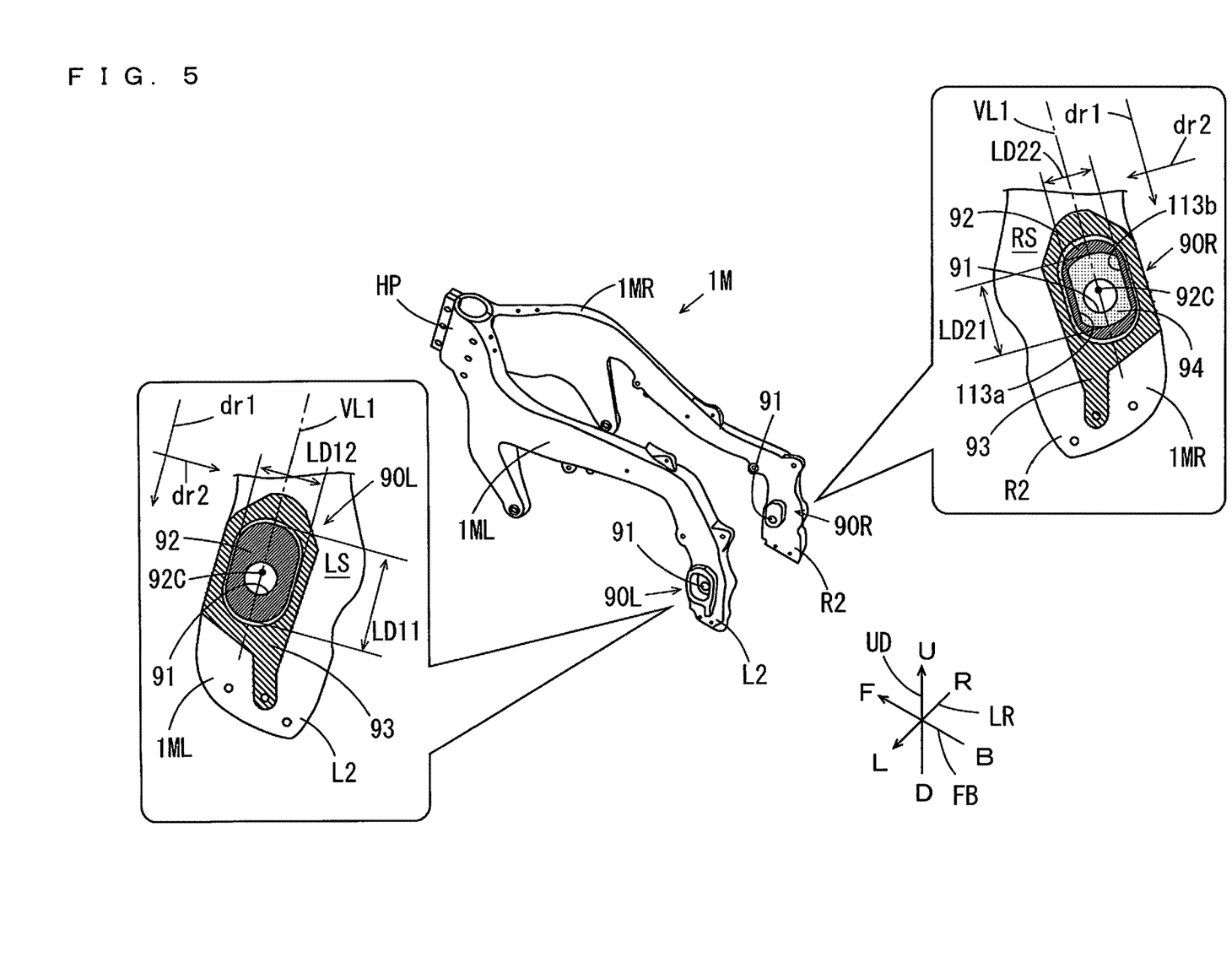
FIG. 5 is a diagram for explaining the details of the pivot shaft supporting portion.

FIGS. 4 and 5 are diagrams for explaining the details of the pivot shaft supporting portions 90L, 90R. In FIG. 4, an external perspective view of the main frame member 1M described in a left lower field of FIG. 1 is shown. Further, a left side view of the left pivot shaft supporting portion 90L and a right side view of the right pivot shaft supporting portion 90R are shown in the balloons respectively corresponding to the pivot shaft supporting portions 90L, 90R. In FIG. 5, an external perspective view of the main frame member 1M described in a right lower field of FIG. 1 is shown. Further, a left side view of the left pivot shaft supporting portion 90L and a right side view of the right pivot shaft supporting portion 90R are shown in the balloons respectively corresponding to the pivot shaft supporting portions 90L, 90R.

In the following description, the portion, which is in the vicinity of the second end portion L2 and adjacent to the pivot shaft supporting portion 90L, of the left side surface of the left main rail 1ML is referred to as a left reference surface LS. Further, the portion, which is in the vicinity of the fourth end portion R2 and adjacent to the pivot shaft supporting portion 90R, of the right side surface of the right main rail 1MR is referred to as a right reference surface RS. Further, in a side view of the main frame member 1M, the direction in which the main rail 1ML extends from a position that is spaced apart upwardly from the second and fourth end portions L2, R2 by a predetermined distance toward the second and fourth end portions L2, R2 is referred to as a first direction dr1. Further, the direction that is orthogonal to the first direction dr1 in a side view of the main frame member 1M is referred to as a second direction dr2.

As shown in FIGS. 4 and 5, the left pivot shaft supporting portion 90L includes the hole formable portion 92 and a reinforcing portion 93. In FIGS. 4 and 5, in order to facilitate understanding of the shapes of the hole formable portions 92 and the reinforcing portions 93, the hole formable portions 92 are darkly hatched, and the reinforcing portions 93 are lightly hatched.

In a side view of the main frame member 1M, the hole formable portion 92 of the left pivot shaft supporting portion 90L has an area larger than that of the head portion P1 of the pivot shaft PV and has an oblong shape extending in the first direction dr1. A length LD11 in the first direction dr1 of the hole formable portion 92 is sufficiently larger than the maximum length LD1 (FIG. 3) of the head portion P1 of the pivot shaft PV. On the other hand, a length LD12 in the second direction dr2 of the hole formable portion 92 is slightly larger than the maximum length LD1 (FIG. 3) of the head portion P1 of the pivot shaft PV. Further, the surface directed leftwardly of the main frame member 1M of the left hole formable portion 92 is formed to be flat.

The reinforcing portion 93 of the left pivot shaft supporting portion 90L is formed to surround the hole formable portion 92 in a side view of the main frame member 1M and project leftwardly, i.e., project in a direction orthogonal to the first and second directions dr1 and dr2, from the hole formable portion 92 and the left reference surface LS. Thus, the reinforcing portion 93 functions as a rib that improves rigidity of the left hole formable portion 92. Further, in the left pivot shaft supporting portion 90L, the hole formable portion 92 and the reinforcing portion 93 are formed to be able to store at least part of the nut PN of FIG. 2 in an inner space of the reinforcing portion 93. The left reinforcing portion 93 does not necessarily have to be formed to project leftwardly. The portion directed leftwardly in the left reinforcing portion 93 may be flush with the left reference surface LS.

The right pivot shaft supporting portion 90R is basically formed to be symmetric with the left pivot shaft supporting portion 90L with respect to a vertical plane extending in the front-and-rear direction FB. Therefore, the pivot shaft supporting portion 90R has the hole formable portion 92 and a reinforcing portion 93 similarly to the pivot shaft supporting portion 90L.

Specifically, in a side view of the main frame member 1M, the hole formable portion 92 of the right pivot shaft supporting portion 90R has an area larger than that of the head portion P1 of the pivot shaft PV and has an oblong shape extending in the first direction dr1. Further, the surface directed rightwardly of the main frame member 1M of the right hole formable portion 92 is formed to be flat. Further, the reinforcing portion 93 of the right pivot shaft supporting portion 90R is formed to surround the hole formable portion 92 and project rightwardly, i.e., project in a direction orthogonal to the first and second directions dr1 and dr2, from the hole formable portion 92 and the right reference surface RS. Similarly to the left reinforcing portion 93, the right reinforcing portion 93 does not necessarily have to be formed to project rightwardly. The portion directed rightwardly of the right reinforcing portion 93 may be flush with the right reference surface RS.

Here, a rotation restricting portion 94 is further provided in the right pivot shaft supporting portion 90R. The rotation restricting portion 94 is formed inside of the right hole formable portion 92 to be directed rightwardly and dented and has an oblong shape extending in the first direction dr1. In FIGS. 4 and 5, in order to facilitate understanding of the shape of the rotation restricting portion 94, a dotted pattern is applied to the rotation restricting portion 94.

In a side view of the main frame member 1M, the rotation restricting portion 94 has an area larger than that of the head portion P1 of the pivot shaft PV. A length (first length) LD21 in the first direction dr1 of the rotation restricting portion 94 is larger than the maximum length LD1 (FIG. 3) of the head portion P1 of the pivot shaft PV and smaller than the length LD11 in the first direction dr1 of the hole formable portion 92. On the other hand, a length (second length) LD22 in the second direction dr2 of the rotation restricting portion 94 is slightly larger than the minimum length LD2 (FIG. 3) of the head portion P1 of the pivot shaft PV and smaller than the maximum length LD1 (FIG. 3) of the head portion P1 of the pivot shaft PV.

Here, the two portions, which extend linearly in parallel with the first direction dr1 and are opposite to each other, of an inner edge of the rotation restricting portion 94 are referred to as restricting portions 113a, 113b. The above-mentioned length LD22 is equivalent to the distance between the two restricting portions 113a, 113b.

In the rotation restricting portion 94, the pivot shaft PV is inserted into the left and right pivot holes 91 as shown in FIG. 2, whereby the head portion P1 of the pivot shaft PV is fitted into the rotation restricting portion 94. In this case, with the relationship between the dimension of the rotation restricting portion 94 and the dimension of the head portion P1, the restricted portions 111a, 111b of the head portion P1 of FIG. 3 are in close proximity to the restricting portions 113a, 113b of the rotation restricting portion 94, respectively.

Thus, even in a case where a rotational force is applied to the pivot shaft PV when the nut PN is attached to the pivot shaft PV, the restricted portions 111a, 111b of the head portion P1 abut against the restricting portions 113a, 113b of the rotation restricting portion 94. Thus, rotation of the pivot shaft PV is restricted. Therefore, the pivot shaft PV can be easily attached to the main frame member 1M.

In a side view of the main frame member 1M, the straight line that passes through a center portion 92C of the hole formable portion 92 and extends in parallel with the first direction dr1 is referred to as a virtual line VL1. As described above, in a side view of the main frame member 1M, each of the hole formable portion 92 and the rotation restricting portion 94 is formed to have an area larger than that of the head portion P1 of the pivot shaft PV and extend in the first direction dr1. With such a configuration, in a side view of the main frame member 1M, the pivot hole 91 can be formed at a desirable position on the virtual line VL1 in the hole formable portion 92. In the example of FIG. 4, in each of the left and right main rails 1ML, 1MR, the pivot hole 91 is formed such that its center is located at a position slightly farther upward than the center portion 92C of the hole formable portion 92. On the other hand, in the example of FIG. 5, the pivot hole 91 is formed such that its center is located at a position slightly farther downward than the center portion 92C of the hole formable portion 92.

[4] Various Setting Examples Corresponding to Vehicle Types

Figure 6:
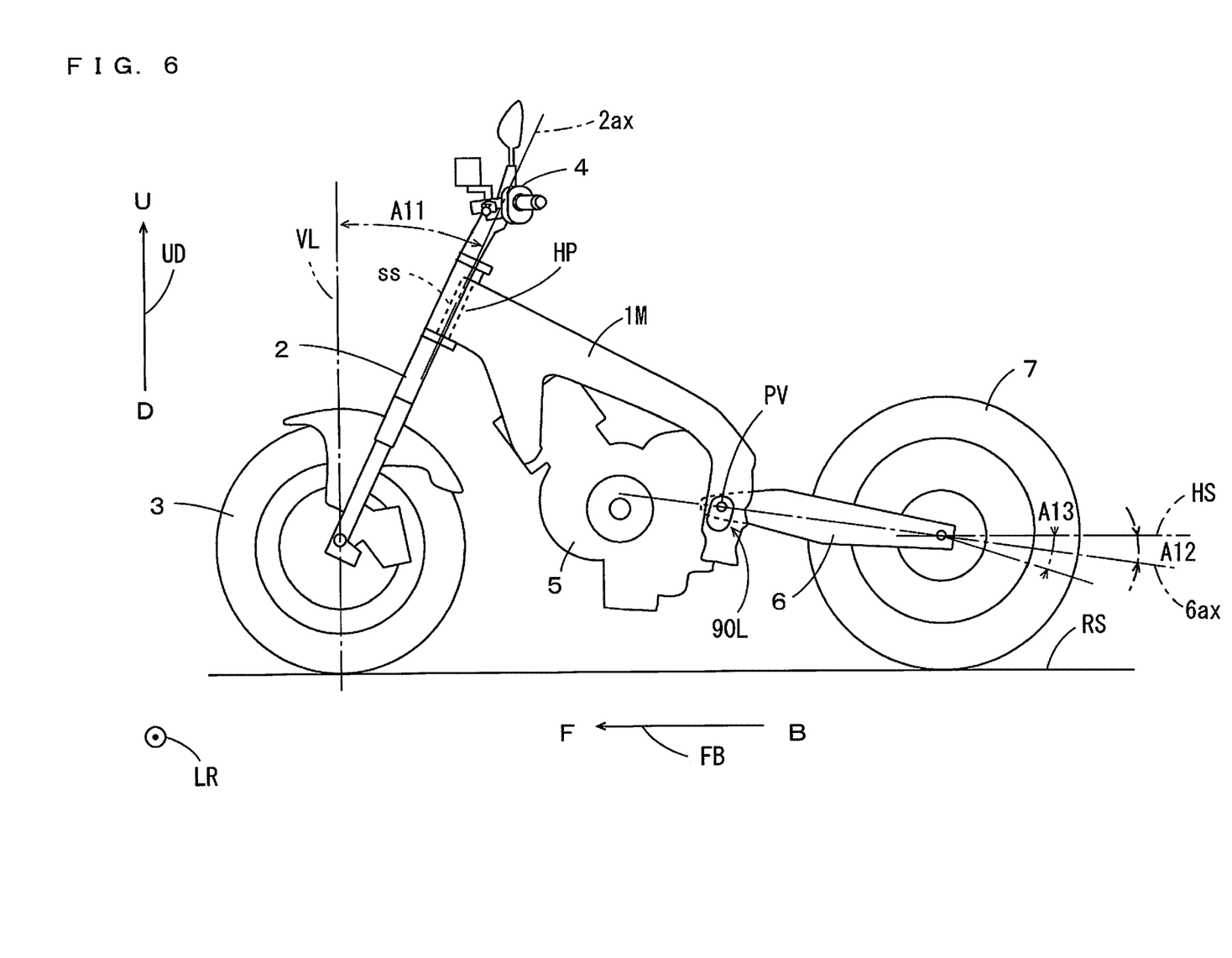
FIG. 6 is a side view for explaining one setting example in regard to riding comfort of a motorcycle using a main frame member of FIG. 4.
Figure 7:
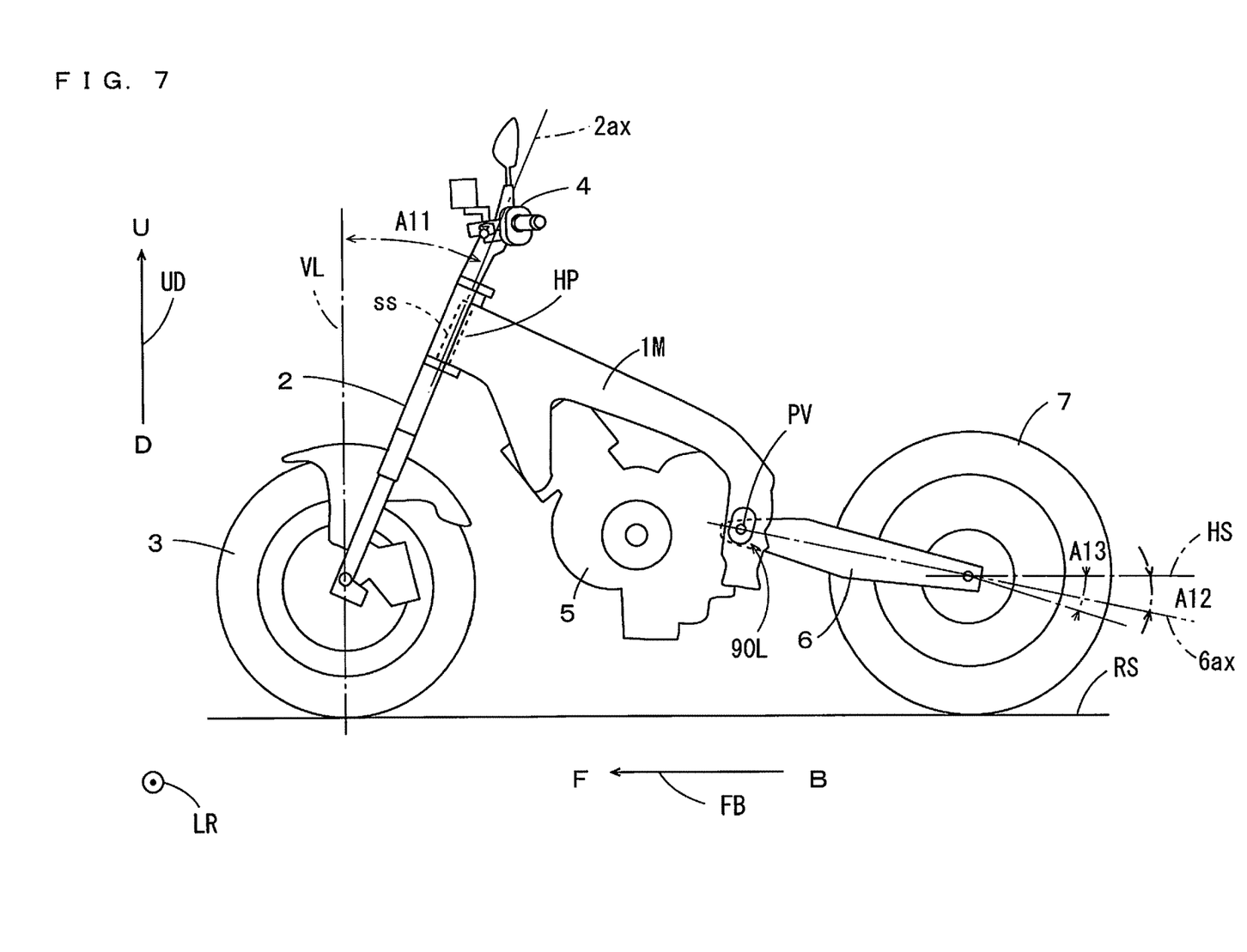
FIG. 7 is a side view for explaining another setting example in regard to riding comfort of a motorcycle using a main frame member of FIG. 5.

FIG. 6 is a side view for explaining one setting example in regard to riding comfort of the motorcycle in which the main frame member 1M of FIG. 4 is used, and FIG. 7 is a side view for explaining another setting example in regard to riding comfort of the motorcycle in which the main frame member 1M of FIG. 5 is used. In FIGS. 6 and 7, parts of a plurality of constituent elements of the motorcycle are shown. Specifically, in FIGS. 6 and 7, a front fork 2, a front wheel 3, a handle 4, an engine 5, a rear arm 6 and a rear wheel 7 out of the plurality of constituent elements included in the motorcycle are shown.

The front fork 2 is attached to the head pipe HP of the main frame member 1M to be swingable in the left-and-right direction LR. The front wheel 3 is rotatably supported at the lower end of the front fork 2. The handle 4 is attached to the upper end of the front fork 2. The engine 5 is supported by the main frame member 1M at a position farther downward than the head pipe HP. The rear arm 6 is connected to the rear end of the main frame member 1M with the pivot shaft PV and extends rearwardly. The rear wheel 7 is rotatably supported at the rear end of the rear arm 6.

A caster angle is mentioned as an element that affects riding comfort of the motorcycle. The caster angle is the angle between the vertical line VL with respect to the road surface and an axial center 2ax of the steering shaft ss supported by the head pipe HP of the main frame member 1M. In FIGS. 6 and 7, the caster angle is indicated by a reference number A11.

Further, an inclination angle (hereinafter referred to as an arm inclination angle) of an axial center 6ax of the rear arm 6 with respect to a horizontal plane HS is mentioned as an element that affects riding comfort of the motorcycle. In FIGS. 6 and 7, the arm inclination angle is indicated by a reference number A12. The arm inclination angle A12 is mainly defined in accordance with the position of the pivot hole 91 formed in the main frame member 1M. The arm inclination angle A12 is defined such that desirable riding comfort, desirable motion characteristics and the like in regard to the motorcycle are obtained. The arm inclination angle A12 is set in an allowable arm inclination angular range A13 indicated by the arrows in FIGS. 6 and 7.

The caster angle A11 is set relatively large in the motorcycle of FIG. 6. In this state, the position of the pivot hole 91 is set as shown in the example of FIG. 4 in order to keep the arm inclination angle A12 in the allowable arm inclination angular range A13. In setting of the caster angle A11 of FIG. 6, importance is placed on improvement of stability when the vehicle is traveling in a straight line and mitigation of shock transmitted from the road surface to a rider. Thus, the motorcycle of FIG. 6 is mainly suited for traveling long distances such as motorcycle touring.

On the other hand, the caster angle A11 is set relatively small in the motorcycle of FIG. 7. In this state, the position of the pivot hole 91 is set as shown in the example of FIG. 5 in order to keep the arm inclination angle A12 in the allowable arm inclination angular range A13. In setting of the caster angle A11 of FIG. 7, importance is placed on improvement of responsiveness of the vehicle to an operation of the handle 4 and easiness in recognition of a contact state of a wheel with the ground surface by the rider. Thus, the motorcycle of FIG. 7 is mainly suited for traveling short distances such as motorcycle racing.

[5] Specific Examples of Motorcycle

Figure 8:
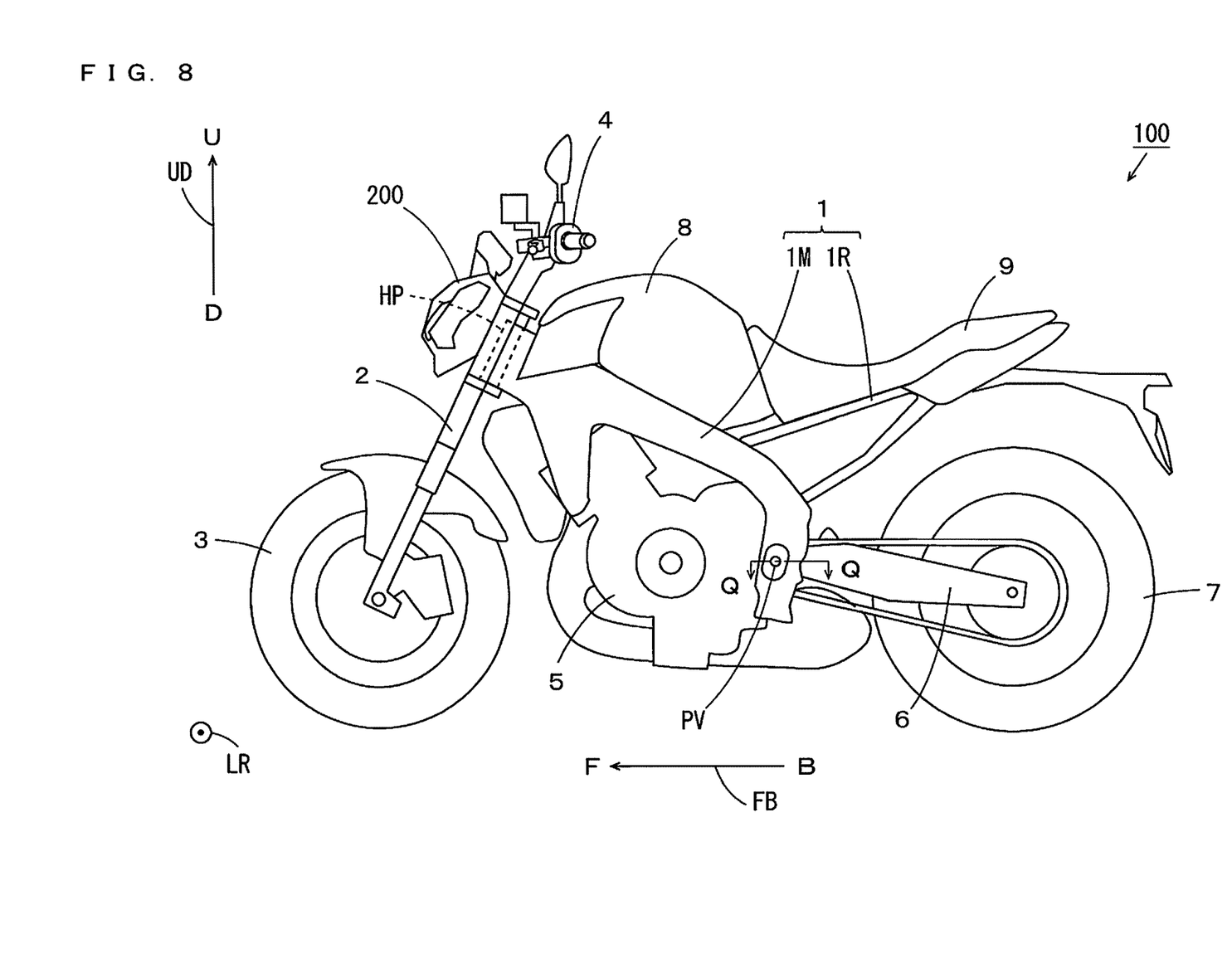
FIG. 8 is a side view showing the specific configuration of the motorcycle including the main frame member of FIG. 4.

FIG. 8 is a side view showing the specific configuration of a motorcycle including the main frame member 1M of FIG. 4. The motorcycle 100 of FIG. 8 further includes a headlamp unit 200, a fuel tank 8, a seat 9 and a rear frame member 1R in addition to the plurality of constituent elements described in FIG. 6.

The headlamp unit 200 is provided forwardly of the head pipe HP of the main frame member 1M. The rear frame member 1R is attached to the main frame member 1M so as to extend rearwardly and slightly upwardly from the rear end of the main frame member 1M and its vicinity.

The fuel tank 8 is provided to be located upwardly of the engine 5 and rearwardly of the head pipe HP. The seat 9 is provided rearwardly of the fuel tank 8. The fuel tank 8 is supported by the main frame member 1M, and the seat 9 is supported by the rear frame member 1R. In the motorcycle 100 according to the present embodiment, the main frame member 1M and the rear frame member 1R are connected to each other, whereby the body frame 1 is formed. In the motorcycle 100 of FIG. 8, the rear wheel 7 is rotated as a drive wheel by motive power generated by the engine 5. Thus, the motorcycle 100 travels.

Also in regard to a motorcycle including the main frame member 1M of FIG. 5, similarly to the example of FIG. 8, the headlamp unit 200, the fuel tank 8, the seat 9 and the rear frame member 1R are provided in addition to the plurality of constituent elements described in FIG. 7. In a motorcycle including the main frame member 1M of FIG. 7, various cover members (cowls) for reducing air resistance generated during traveling of the vehicle may further be provided.

[6] Connection Between Main Frame Member 1M and Rear Arm 6 by Pivot Shaft PV

Figure 9:
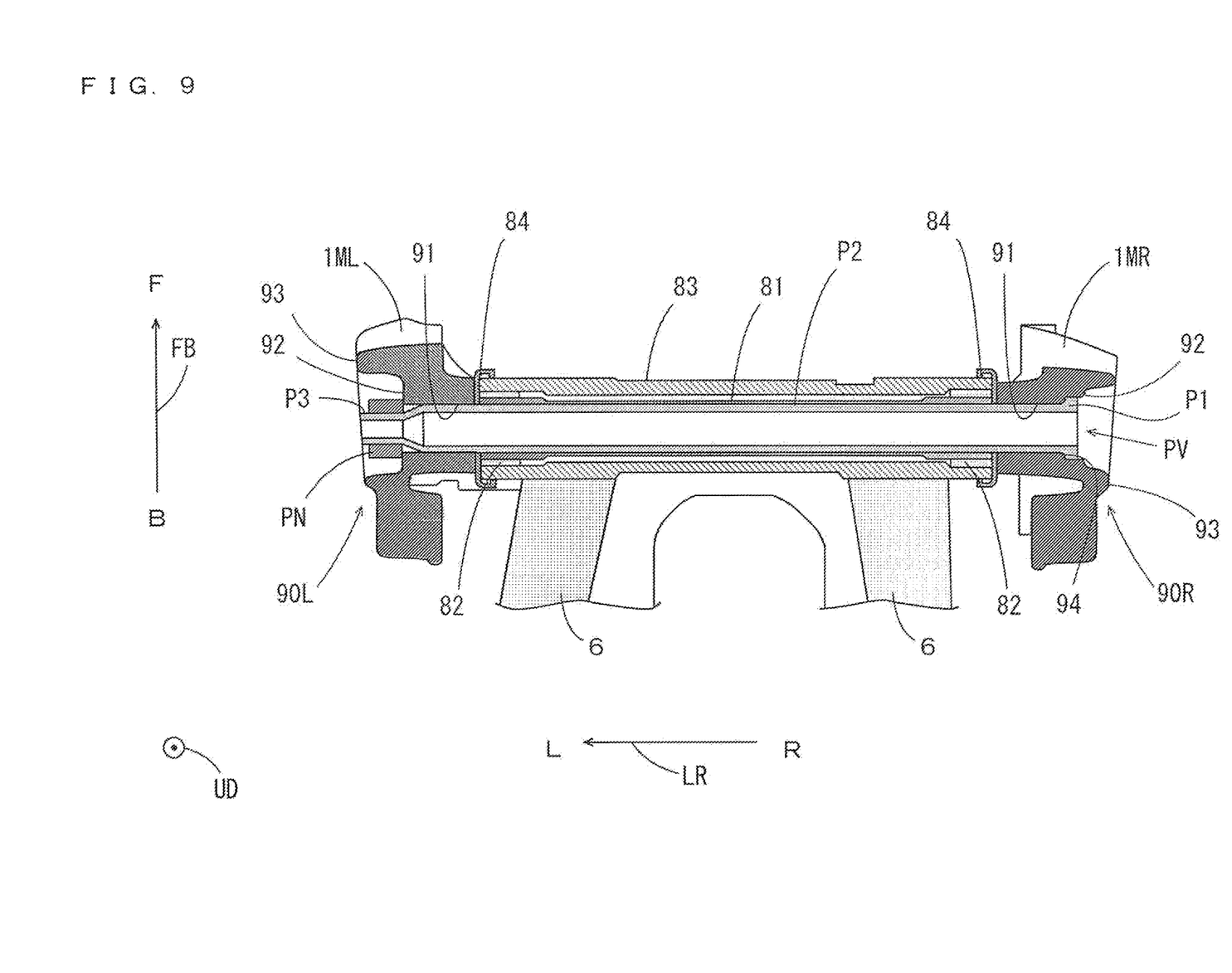
FIG. 9 is a cross sectional view taken along the line Q-Q of FIG. 8.

Specific examples of the connection between the main frame member 1M and the rear arm 6 by the pivot shaft PV will be described. FIG. 9 is a cross sectional view taken along the line Q-Q of FIG. 8. In FIG. 9, a coupling member 40 (FIG. 10), described below, provided below the pivot shaft PV is not shown.

As shown in FIG. 9, the pivot shaft PV is inserted from the right into the pivot hole 91 of the right main rail 1MR and the pivot hole 91 of the left main rail 1ML. The head portion P1 of the pivot shaft PV is fitted into the rotation restricting portion 94 of the right main rail 1MR. On the other hand, the screw portion P3 of the pivot shaft PV is located in the reinforcing portion 93 of the left main rail 1ML. In this state, the nut PN is attached to the screw portion P3.

A cylindrical first collar member 81 is attached to the portion, located between the left and right main rails 1ML, 1MR, of the shaft portion P2 of the pivot shaft PV to cover the entire portion. In this state, the first collar member 81 is fixed to the pivot shaft PV.

A cylindrical second collar member 83 is attached to the first collar member 81 to further cover the first collar member 81 with two needle bearings 82. The two needle bearings 82 are respectively provided between the outer peripheral surface of the first collar member 81 and the inner peripheral surface of the second collar member 83 at both ends of the first and second collar members 81, 83. In this state, the second collar member 83 is rotatable about the pivot shaft PV by the two needle bearings 82.

A lid member 84 for sealing a lubricant used for the needle bearing 82, for example, inside of the second collar member 83 is provided between the first collar member 81, the left needle bearing 82 and the left end of the second collar member 83, and the left main rail 1ML. Further, a lid member 84 for sealing a lubricant used for the needle bearing 82 inside of the second collar member 83 is provided between the first collar member 81, the right needle bearing 82 and the right end of the second collar member 83, and the right main rail 1MR.

The front end of the rear arm 6 is connected to the second collar member 83 by welding. With the above-mentioned configuration, the front end of the rear arm 6 is supported by the pivot shaft PV to be rotatable about the pivot shaft PV.

[7] Painting Method of Body Frame 1

Figure 10:
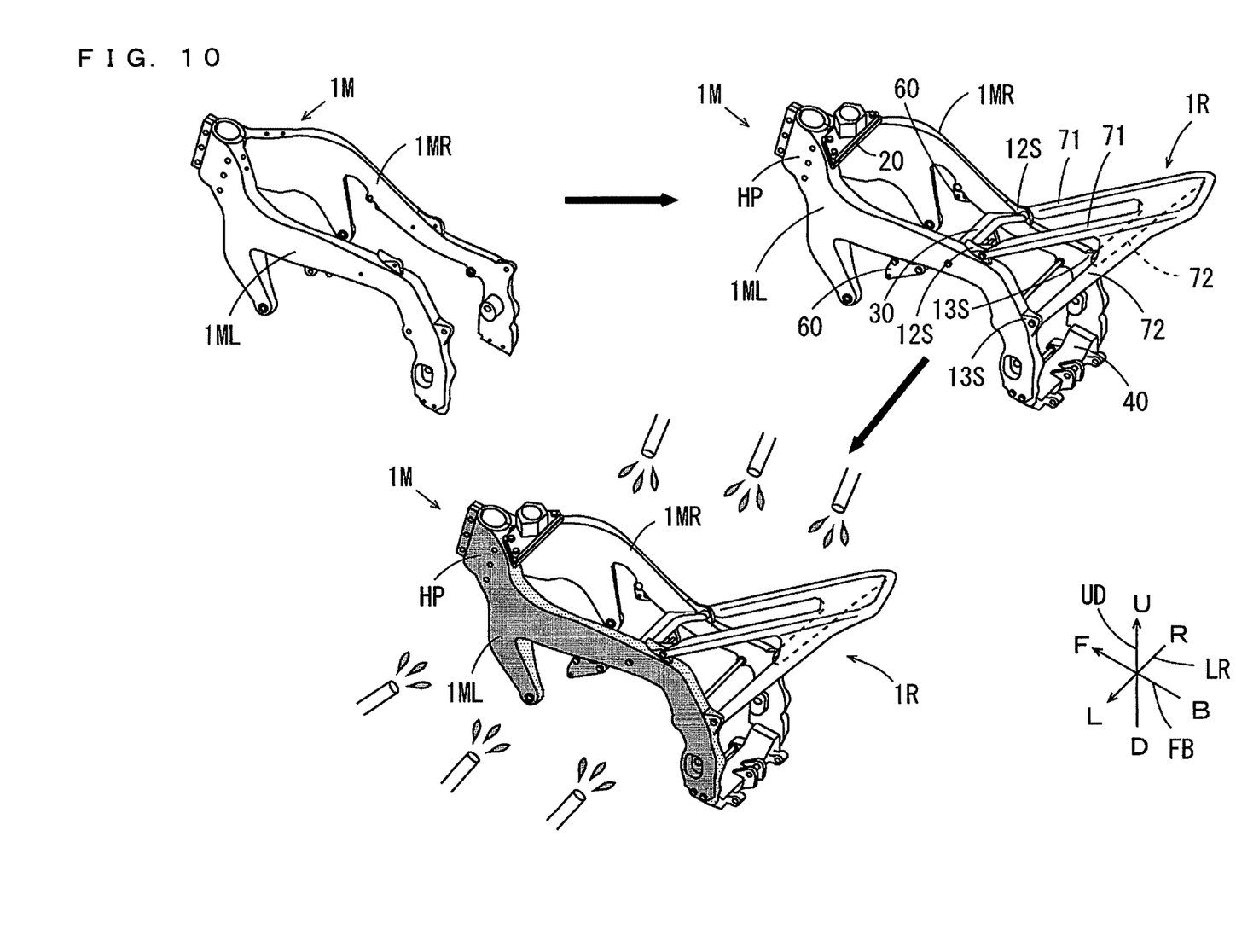
FIG. 10 is an external perspective view showing one example of a method of painting the body frame.

The manufacturing method of the body frame 1 according to the present embodiment includes the step of painting the body frame 1. FIG. 10 is an external perspective view showing one example of the method of painting the body frame 1. As shown in the upper field in FIG. 10, a plurality of coupling members 20, 30, 40 and left and right engine brackets 60 for ensuring rigidity of each component of the main frame member 1M are provided at the main frame member 1M before painting.

The coupling member 20 couples front portions in the front-and-rear direction FB of the left and right main rails 1ML, 1MR to each other. The coupling member 30 couples middle portions in the front-and-rear direction FB of the left and right main rails 1ML, 1MR to each other. The left and right engine brackets 60 are attached to middle portions in the front-and-rear direction FB of the left and right main rails 1ML, 1MR. The coupling member 40 couples lower rear end portions in the front-and-rear direction FB of the left and right main rails 1ML, 1MR to each other.

Further, the rear frame member 1R before painting is attached to the main frame member 1M before painting. Specifically, the rear frame member 1R is constituted by a pair of left and right upper rails 71 and a pair of left and right lower rails 72. The left and right upper rails 71 are formed to be arranged in the left-and-right direction LR and extend in the front-and-rear direction FB, and their rear end portions are connected to each other. On the other hand, the left and right lower rails 72 are formed to extend downwardly and forwardly from positions in the vicinity of the rear end portions of the left and right upper rails 71. With such a configuration, the rear frame member 1R has a substantially U-shape in a plan view of the vehicle.

Two frame connecting portions 12S corresponding to the left and right upper rails 71 of the rear frame member 1R are respectively formed at the left and right main rails 1ML, 1MR. Further, two frame connecting portions 13S corresponding to the left and right lower rails 72 of the rear frame member 1R are respectively formed at the left and right main rails 1ML, 1MR. The left and right upper rails 71 are respectively connected to the two frame connecting portions 12S, and the left and right lower rails 72 are respectively connected to the two frame connecting portions 12S. Thus, the rear frame member 1R is attached to the main frame member 1M.

As shown in the lower field of FIG. 10, the main frame member 1M and the rear frame member 1R are painted after the rear frame member 1R is attached to the main frame member 1M. In this case, it is not necessary to paint the main frame member 1M and the rear frame member 1R, separately. Therefore, it is not necessary to perform masking on the connecting portions between the main frame member 1M and the rear frame member 1R. Therefore, the number of steps of manufacturing the motorcycle 100 can be reduced, so that a manufacturing cost of the motorcycle 100 can be reduced.

In the example of FIG. 10, parts or all of the coupling members 20, 30, 40 and the left and right engine brackets 60 may be attached to the body frame 1 after the body frame 1 is painted.

[8] Effects (1) With the manufacturing method of the body frame 1 according to the present embodiment, the plurality of main frame members 1M commonly used in the plurality of types of motorcycles 100 are fabricated. The left and right main rails 1ML, 1MR of each main frame member 1M include the pivot shaft supporting portions 90L, 90R, respectively. The hole formable portion 92 is formed in the left pivot shaft supporting portion 90L, and the hole formable portion 92 and the rotation restricting portion 94 are formed in the right pivot shaft supporting portion 90R.

Here, the hole formable portion 92 has an area larger than that of the head portion P1 of the pivot shaft PV in a side view of the main frame member 1M. Therefore, in the left and right hole formable portions 92, the pivot holes 91 can be formed at a plurality of mutually different positions in accordance with the type of a motorcycle 100. Thus, in the hole formable portions 92 of each main frame member 1M, the pivot holes 91 are formed at positions corresponding to the type of the motorcycle 100 in which the main frame member 1M is to be used. In this case, because the common main frame member 1M can be used in the plurality of types of motorcycles 100, the cost required for fabricating the plurality of body frames 1 for the plurality of types of motorcycles 100 is reduced.

Further, with the above-mentioned manufacturing method, it is not necessary to prepare another member such as a spacer in order to arrange the pivot shaft PV at a desirable position in the body frame 1. Thus, an increase in dimension error of the supporting position of the pivot shaft PV is reduced.

Further, with the above-mentioned configuration of each main frame member 1M, the rotation of the head portion P1 of the pivot shaft PV is restricted by the rotation restricting portion 94 when the pivot shaft PV is attached to the main frame member 1M. Thus, the pivot shaft PV can be easily attached to the left and right pivot holes 91.

As a result, the plurality of types of motorcycles 100 having mutually different riding comfort can be manufactured at low cost and with high accuracy.

(2) Each hole formable portion 92 is formed to extend along the virtual line VL1 in parallel with the first direction dr1. The length in the first direction dr1 of the hole formable portion 92 is larger than the maximum length LD1 of the head portion P1 of the pivot shaft PV. Further, the rotation restricting portion 94 is formed to extend in the first direction dr1 and is formed such that the head portion P1 of the pivot shaft PV can be fitted into the rotation restricting portion 94. Further, the length LD21 in the first direction dr1 of the rotation restricting portion 94 is larger than the maximum length LD1 of the head portion P1 of the pivot shaft PV, and the length LD22 in the second direction dr2 of the rotation restricting portion 94 is smaller than the maximum length LD1 of the head portion P1 of the pivot shaft PV.

In this case, the plurality of positions on the virtual line VL1 extending in the first direction dr1 in the rotation restricting portion 94 can be defined as the positions at which the pivot hole 91 is to be formed. In this manner, because the positions at which the pivot hole 91 is to be formed can be defined on the predetermined virtual line VL1, the pivot hole 91 can be set easily in accordance with the type of the motorcycle 100.

(3) In each of the left and right pivot shaft supporting portions 90L, 90R, the reinforcing portion 93 is formed to surround the hole formable portion 92. In this case, rigidity of the area around the pivot hole 91 is improved by the reinforcing portion 93 in each main frame member 1M. Therefore, the attachment state of the pivot shaft PV with respect to the body frame 1 is more sufficiently stabilized.

[9] Other Embodiments (1) While the main frame member 1M is formed by the connection of the pair of left and right main rails 1ML, 1MR to each other using the plurality of bolts and nuts in the motorcycle 100 according to the above-mentioned embodiment, the present invention is not limited to this.

The main frame member 1M may be formed by connection of the main rails 1ML, 1MR to each other by welding. Alternatively, the main frame member 1M may be formed by connection of the pair of left and right rail members to a single member including the head pipe HP, for example, by welding.

(2) While the hole formable portion 92 has an oblong shape in the main frame member 1M according to the above-mentioned embodiment, the present invention is not limited to this. The hole formable portion 92 may have an area larger than that of the head portion P1 of the pivot shaft PV in a side view of the main frame member 1M, and may have a perfect circular shape. Alternatively, the hole formable portion 92 may have a polygon shape such as a triangle shape or a square shape in a side view of the main frame member 1M.

(3) While the rotation restricting portion 94 has an oblong shape in the main frame member 1M according to the above-mentioned embodiment, the present invention is not limited to this. The rotation restricting portion 94 may be formed to restrict the rotation of the head portion P1 of the pivot shaft PV, and may have a polygon shape having any one of the above-mentioned restricting portions 113a, 113b, for example.

(4) While the reinforcing portion 93 is formed to surround the hole formable portion 92 in each of the pivot shaft supporting portions 90L, 90R in the above-mentioned embodiment, the present invention is not limited to this. The reinforcing portion 93 does not have to be formed.

(5) While the rear frame member 1R is attached to the main frame member 1M, and then the surfaces of the main frame member 1M and the rear frame member 1R are painted in the manufacturing method of the body frame 1 according to the above-mentioned embodiment, the present invention is not limited to this. The main frame member 1M and the rear frame member 1R may be painted separately.

(6) While the above-mentioned embodiment is an example in which the present invention is applied to the manufacturing method of a motorcycle, the present invention is not limited to this. The present invention may be applied to a manufacturing method of another straddled vehicle such as a four-wheeled automobile, a motor tricycle or an ATV (All Terrain Vehicle).

[10] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, the motorcycle 100 is an example of a straddled vehicle, the main frame member 1M is an example of a main frame member, the pivot shaft PV is an example of a pivot shaft, the pivot hole 91 is an example of a pivot hole, the hole formable portion 92 is an example of a hole formable portion and the rotation restricting portion 94 is an example of a rotation restricting portion.

Further, the head pipe HP is an example of a head pipe, the left and right main rails 1ML, 1MR are an example of a pair of left and right main rails, the head portion P1 of the pivot shaft PV is an example of a head portion of a pivot shaft, the reinforcing portion 93 is an example of a reinforcing portion and the rear frame member 1R is an example of a rear frame member.

As each of various elements recited in the claims, various other elements having configurations or functions described in the claims can be also used.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

What is claimed is:

1. A manufacturing method of a body frame, including:
fabricating a plurality of main frame members that are commonly usable for a plurality of types of straddled vehicles; and
forming a left pivot hole and a right pivot hole between which a pivot shaft is attachable in each main frame member, wherein
said each main frame member includes a left pivot shaft supporting portion and a right pivot shaft supporting portion,
each pivot shaft supporting portion including a hole formable portion which has an area larger than an area of a head portion of the pivot shaft,
at least one of the left pivot shaft supporting portion and the right pivot shaft supporting portion including a rotation restricting portion that restricts rotation of the head portion of the pivot shaft inserted into the left and right pivot holes, the forming a left pivot hole and a right pivot hole in said each main frame member includes respectively forming the left and right pivot holes at predetermined positions within areas of the left and right pivot shaft supporting portions of said each main frame member, the predetermined positions being different in accordance with a type of a straddled vehicle for which said each main frame member is to be used, and the rotation restricting portion is a dent formed such that the head portion of the pivot shaft is fittable into the dent with the pivot shaft inserted into the left and right pivot holes, the dent having an inner peripheral surface that surrounds the head portion and when a rotational force acts on the pivot shaft, abuts against a part of the head portion to restrict the rotation of the pivot shaft with the pivot shaft inserted into the left and right pivot holes.

2. The manufacturing method of the body frame according to claim 1, wherein said each main frame member constitutes a head pipe, and includes left and right main rails that are in a pair and, from the head pipe, respectively extend rearwardly and downwardly while spreading leftwardly and rightwardly, the hole formable portion is formed at each of the left and right pivot shaft supporting portions of the left and right main rails, the left and right pivot shaft supporting portions facing each other, and the rotation restricting portion is formed at the hole formable portion of one of the left and right main rails.

3. A manufacturing method of a body frame, comprising:

fabricating a plurality of main frame members that are commonly usable for a plurality of types of straddled vehicles; and forming a left pivot hole and a right pivot hole between which a pivot shaft is attachable in each main frame member, wherein said each main frame member includes a left pivot shaft supporting portion and a right pivot shaft supporting portions, each pivot shaft supporting portion including a hole formable portion which has an area larger than an area of a head portion of the pivot shaft, at least one of the left pivot shaft supporting portion and the right pivot shaft supporting portion including a rotation restricting portion that restricts rotation of the head portion of the pivot shaft inserted into the left and right pivot holes, the forming a left pivot hole and a right pivot hole in said each main frame member includes respectively forming the left and right pivot holes at predetermined positions within areas of the left and right pivot shaft supporting portions of said each main frame member, the predetermined positions being different in accordance with a type of a straddled vehicle for which said each main frame member is to be used, the head portion of the pivot shaft has an oblong shape, the rotation restricting portion is formed such that the head portion of the pivot shaft is fittable into the rotation restricting portion, and has a first length in a first direction and a second length in a second direction orthogonal to the first direction, the first length in the first direction of the rotation restricting portion is larger than a maximum dimension of the head portion of the pivot shaft, and the second length in the second direction of the rotation restricting portion is smaller than the maximum dimension of the head portion of the pivot shaft.

4. The manufacturing method of the body frame according to claim 1, wherein said each pivot shaft supporting portion of said each main frame member further includes a reinforcing portion that surrounds the hole formable portion and projects sidewardly of said each main frame member.

5. A manufacturing method of a body frame, comprising:

fabricating a plurality of main frame members that are commonly usable for a plurality of types of straddled vehicles; and forming a left pivot hole and a right pivot hole between which a pivot shaft is attachable in each main frame member, wherein said each main frame member includes a left pivot shaft supporting portion and a right pivot shaft supporting portions, each pivot shaft supporting portion includes a hole formable portion which has an area larger than an area of a head portion of the pivot shaft, at least one of the left pivot shaft supporting portion and the right pivot shaft supporting portion includes a rotation restricting portion that restricts rotation of the head portion of the pivot shaft inserted into the left and right pivot holes, and the forming a left pivot hole and a right pivot hole in said each main frame member includes respectively forms the left and right pivot holes at predetermined positions within areas of the left and right pivot shaft supporting portions of said each main frame member, the predetermined positions being different in accordance with a type of a straddled vehicle for which said each main frame member is to be used, the manufacturing method of the body frame further comprising:

attaching a rear frame member to said each main frame member; and painting said each main frame member and the rear frame member after attaching the rear frame member to said each main frame member.

6. A manufacturing method of a body frame, comprising:

fabricating a plurality of main frame members that are commonly usable for a plurality of types of straddled vehicles; and forming a left pivot hole and a right pivot hole between which a pivot shaft is attachable in each main frame member, wherein said each main frame member includes a left pivot shaft supporting portion and a right pivot shaft supporting portions, each pivot shaft supporting portion includes a hole formable portion which has an area larger than an area of a head portion of the pivot shaft, at least one of the left pivot shaft supporting portion and the right pivot shaft supporting portion includes a rotation restricting portion that restricts rotation of the head portion of the pivot shaft inserted into the left and right pivot holes, the forming a left pivot hole and a right pivot hole in said each main frame member includes respectively forming the left and right pivot holes at predetermined positions within areas of the left and right pivot shaft supporting portions of said each main frame member, the predetermined positions being different in accordance with a type of a straddled vehicle for which said each main frame member is to be used, said each main frame member constitutes a head pipe, and includes left and right main rails that are in a pair and, from the head pipe, respectively extend rearwardly and downwardly while spreading leftwardly and rightwardly, the hole formable portion is formed at each of the left and right pivot shaft supporting portions of the left and right main rails, the left and right pivot shaft supporting portions facing each other, and the rotation restricting portion is formed at only the left hole formable portion of the left main rail or the right hole formable portion of the right main rail of said main frame member.

7. The manufacturing method of the body frame according to claim 3, wherein said each pivot shaft supporting portion of said each main frame member further includes a reinforcing portion that surrounds the hole formable portion and projects sidewardly of said each main frame member in a direction orthogonal to both the first and second directions.

\* \* \* \* \*